United States Patent

Fritkin

[15] 3,668,562

[45] June 6, 1972

[54] FREQUENCY MODULATION SYSTEM FOR TRANSMITTING BINARY INFORMATION

[72] Inventor: George A. Fritkin, Silver Spring, Md.

[73] Assignee: Tel-Tech Corporation, Silver Spring, Md.

[22] Filed: Apr. 15, 1970

[21] Appl. No.: 28,740

[52] U.S. Cl. ................................332/9 R, 178/66, 325/163, 332/1, 332/22

[51] Int. Cl. ......................................................H04l 27/12

[58] Field of Search .....................332/1, 9, 9 T, 10, 16, 16 T, 332/221; 325/30, 163; 178/66; 328/27

[56] References Cited

UNITED STATES PATENTS

| | | | |
|---|---|---|---|
| 3,095,539 | 6/1963 | Bennett et al | 178/66 |
| 3,102,238 | 8/1963 | Bosen | 325/30 UX |
| 3,263,185 | 7/1966 | Lender | 332/9 |
| 3,387,213 | 6/1968 | Lender | 332/9 X |
| 3,454,718 | 7/1969 | Perreault | 328/27 X |
| 3,466,392 | 9/1969 | Calfee | 328/27 X |

OTHER PUBLICATIONS

Fang et al. " Digital Signal Synchronous Modulation Circuits" –IBM Tech. Disclosure Bulletin, Vol. 5, No. 11, Apr., 1963 pp. 94– 96

*Primary Examiner*—Alfred L. Brody
*Attorney*—Finnegan, Henderson & Farabow

[57] ABSTRACT

A system for transmitting binary information in the form of a frequency modulated signal is provided. The system includes a digital to analog converter for converting a series of input pulses into an output signal consisting of a series of incremental voltage changes which is approximately in the form of a sine wave having a frequency determined by the frequency of the input pulses. The system also includes a frequency selecting circuit for controlling the frequency of the input pulses to the digital to analog converter. The frequency selecting circuit is operated by a binary input signal and controls the frequency of the output signal produced by the digital to analog converter. A filter is connected to the output of the digital to analog converter to eliminate discontinuities from the output signal of the converter.

13 Claims, 5 Drawing Figures

INVENTOR
GEORGE A. FRITKIN

Finnegan, Henderson & Farabow
ATTORNEYS

INVENTOR

GEORGE A. FRITKIN

Finnegan, Henderson & Farabow

ATTORNEYS

COUNTING SEQUENCE
D/A CONVERTER

| PULSE NO. | FLIP-FLOP NO. 161 | 162 | 163 | 164 | 165 |
|---|---|---|---|---|---|
| START | 0 | 0 | 0 | 0 | 1 |
| 1 | 1 | 0 | 0 | 0 | 1 |
| 2 | 1 | 1 | 0 | 0 | 1 |
| 3 | 1 | 1 | 1 | 0 | 1 |
| 4 | 1 | 1 | 1 | 1 | 1 |
| 5 | 1 | 1 | 1 | 1 | 0 |
| 6 | 0 | 1 | 1 | 1 | 0 |
| 7 | 0 | 0 | 1 | 1 | 0 |
| 8 | 0 | 0 | 0 | 1 | 0 |
| 9 | 0 | 0 | 0 | 0 | 0 |
| 10 | 0 | 0 | 0 | 0 | 1 |

INVENTOR
GEORGE A. FRITKIN

Finnegan, Henderson & Farabow
ATTORNEYS

FREQUENCY MODULATION SYSTEM FOR TRANSMITTING BINARY INFORMATION

The present invention relates to a frequency modulation system for transmitting binary information and, more particularly, to a system for producing a frequency modulated signal which can be used in transmitting binary information.

In frequency modulation (FM) systems for transmitting information, information is transmitted in the form of a signal of varying frequency. The frequency of the transmitted signal is varied to indicate different items of information. In FM transmission systems it is desirable to accurately produce the frequencies used to transmit information to prevent errors from occurring in the transmission of information.

In the transmission of binary information, an FM system utilizing only two frequencies can be used. In this type of system, a first frequency $F_1$ is used to represent a binary "1" and a second frequency $F_2$ is used to represent a binary "0." A data unit or modem can be used in the system to convert the binary information into frequency modulated sinusoidal signals which are capable of being transmitted by conventional communications equipment, such as radio frequency transmission systems and telephone communication networks.

Data units or modems are particularly useful, for example, in transmitting information from a computer over a telephone communication line. The computer operates on binary signals which constitute the machine language of the computer. The data units convert the binary "1's" and "0's" of the machine language into sinusoidal signals at frequencies which are compatible with the telephone communication line. The sinusoidal signals are applied to the telephone line for transmission to another data unit which reconverts the sinusoidal signals into binary information.

In the construction of data units for converting binary information into frequency modulated signals it is desirable to use digital components. The utilization of digital components permits the accuracy of the operation of the data unit to be determined by the number of circuit components used in the data unit.

An advantage of utilizing digital components is that the accuracy of the operation of the data unit can be improved by merely increasing the number of components in its circuitry. The accuracy of the data unit is also enhanced because the operating characteristics of the digital components employed in the data unit do not vary with time, temperature, or the application of different electrical potentials to the components.

In view of the recent development of inexpensive integrated circuit digital components, another advantage of digital implementation of data units is the ability to construct inexpensive data units by utilizing digital components.

In accordance with the present invention a system for producing a frequency modulated signal is provided. The system of this invention includes a converting circuit for transforming a series of input pulses into a sinusoidal output signal having a frequency determined by the frequency of the input pulses, means for applying a series of input pulses to the converting circuit, and means for varying the frequency of the input pulses applied to the converting circuit to vary the frequency of the sinusoidal output signal and produce a frequency modulated signal.

In a preferred embodiment of the invention, the converting circuit includes a digital to analog converter for converting the series of input pulses into an output signal consisting of a series of incremental voltage changes which is approximately in the form of a sine wave, and a filter for eliminating the discontinuities in the output signal of the digital to analog converter to produce a sinusoidal output signal. In the preferred embodiment, a source for producing pulses at a predetermined frequency is connected to the digital to analog converter through a frequency divider that produces a series of pulses at a frequency which is less than the predetermined frequency. The preferred embodiment of the invention also includes a frequency selecting circuit connected to the frequency divider for controlling the operation of the frequency divider to determine the frequency of the pulses produced at the output of the frequency divider and applied to the digital to analog converter.

The system of the present invention is particularly useful in transmitting binary information. The system transforms a binary input signal into a frequency modulated sinusoidal output signal having a frequency which is related to the binary input signal. The circuit used in the system is particularly suited to implementation by digital circuit components. Thus, integrated circuit components can be used in the construction of the system to maintain the cost of manufacturing the circuit at a minimum and to provide a circuit for accurately producing frequency modulated signals.

The accompanying drawings illustrate a preferred embodiment of the invention and, together with the description, serve to explain the principles of the invention.

Figure 1:
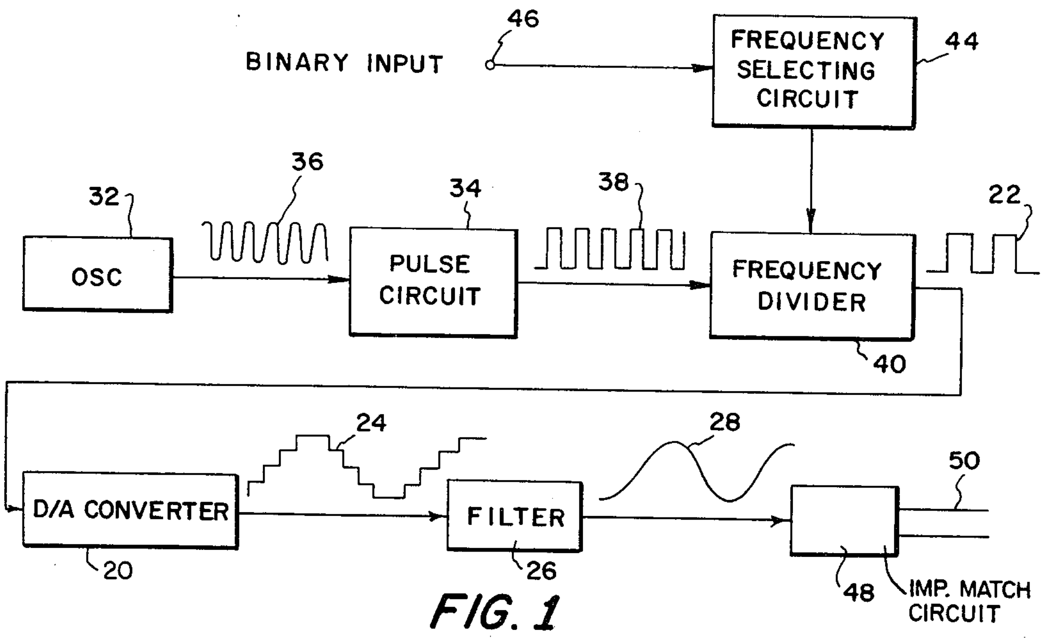
FIG. 1 is a block diagram of a system, including a digital to analog converter, constructed in accordance with the principles of the present invention for producing a frequency modulated signal.

In accordance with the invention, a system for producing a frequency modulated signal includes a converting circuit for transforming a series of input pulses into a sinusoidal output signal having a frequency determined by the frequency of the input pulses. In a preferred embodiment of the invention, the converting circuit includes a digital to analog converter for converting the series of input pulses into an output signal consisting of a series of input pulses into an output signal consisting of a series of incremental voltage changes which is approximately in the form of a sine wave. As shown in FIG. 1, a digital to analog converter 20 is provided for converting a series of input pulses, illustrated by waveform 22, into an output signal, illustrated by waveform 24, which is approximately in the form of a sine wave.

The converting circuit also includes a filter for eliminating the discontinuities in the output signal of the digital to analog converter to produce a sinusoidal output signal. As embodied, a filter 26 is connected to the output of digital to analog converter 20. The filter eliminates the discontinuities in the output signal (waveform 24) of the digital to analog converter and provides a sinusoidal output signal, illustrated by waveform 28.

In accordance with the invention, the frequency modulating system also includes means for applying a series of input pulses to the converting circuit. This means includes a source for producing pulses at a predetermined frequency and a frequency divider connected to the source for producing a series of output pulses at a frequency which is less than the predetermined frequency. As shown in FIG. 1, the source comprises an oscillator 32 which is connected to a pulse forming circuit 34. Oscillator 32 produces a sinusoidal output signal, illustrated by waveform 36, at a predetermined frequency. Pulse forming circuit 34 converts the sinusoidal output signal of oscillator 32 into a series of pulses, illustrated by waveform 38, which occur at the same predetermined frequency.

As shown in FIG. 1, a frequency divider 40 is connected to digital to analog converter 20 and pulse forming circuit 34. Frequency divider 40 produces a series of output pulses (waveform 22) at a frequency which is less than the predetermined frequency of the input pulses (waveform 38) applied to the frequency divider.

In accordance with the invention, the frequency modulating system further includes means for varying the frequency of the input pulses applied to the converting circuit to vary the frequency of the sinusoidal output signal of the system and produce a frequency modulated signal. As embodied, this means comprises a frequency selecting circuit for controlling the operation of the frequency divider to determine the frequency of the pulses produced at the output of the frequency divider. As shown in FIG. 1, a frequency selecting circuit 44 is provided. The frequency selecting circuit is connected to frequency divider 40 and is provided with an input terminal 46.

In the operation of the circuit, binary input signals are applied to input terminal 46 to control the operation of frequency divider 40. The operation of frequency selecting circuit 44 and frequency divider 40 is explained in more detail below.

The frequency modulating system of FIG. 1 is also provided with an output amplifying and impedance matching circuit 48 through which the FM output signal of the system is applied to a telephone line 50. The output amplifying and impedance matching circuit is a conventional circuit arrangement and, therefore, is not described in detail.

In the operation of the frequency modulating system of FIG. 1, a sinusoidal signal of predetermined frequency (waveform 36) is produced by oscillator 32. This signal is applied to pulse forming circuit 34 to produce a series of pulses (waveform 38) at the predetermined frequency. The pulses are applied to frequency divider 40 which produces an output signal (waveform 22) in the form of a series of pulses at a frequency which is less than the predetermined frequency.

A binary input signal, i.e. either "1" or "0," is applied to input terminal 46 of frequency selecting circuit 44. The binary input signal controls the operation of frequency divider 40 through frequency selecting circuit 44 and, thus, determines the frequency of the output pulses (waveform 22) produced by the frequency divider. The frequency divider produces a series of output pulses at frequency $F_1$ when a binary "1" input signal is applied to terminal 46, and a series of pulses at frequency $F_2$ when the input signal to terminal 46 is a binary "0."

The output pulses from frequency divider 40 are applied to digital to analog converter 20 to produce an output signal (waveform 24) consisting of a series of incremental voltage changes approximately in the form of a sine wave. Filter 26 eliminates the discontinuities in the output signal of the digital to analog converter and provides a sinusoidal output signal (waveform 28). The frequency of the sinusoidal output signal of the system is determined by the frequency of the input pulses (waveform 22) to the digital to analog converter and, thus, by the binary input signal applied to frequency selecting circuit 44. The sinusoidal output signal is applied to output amplifying and impedance matching circuit 48 to transmit the signal over telephone line 50 to a receiver (not shown) connected to the telephone line.

Figure 2:
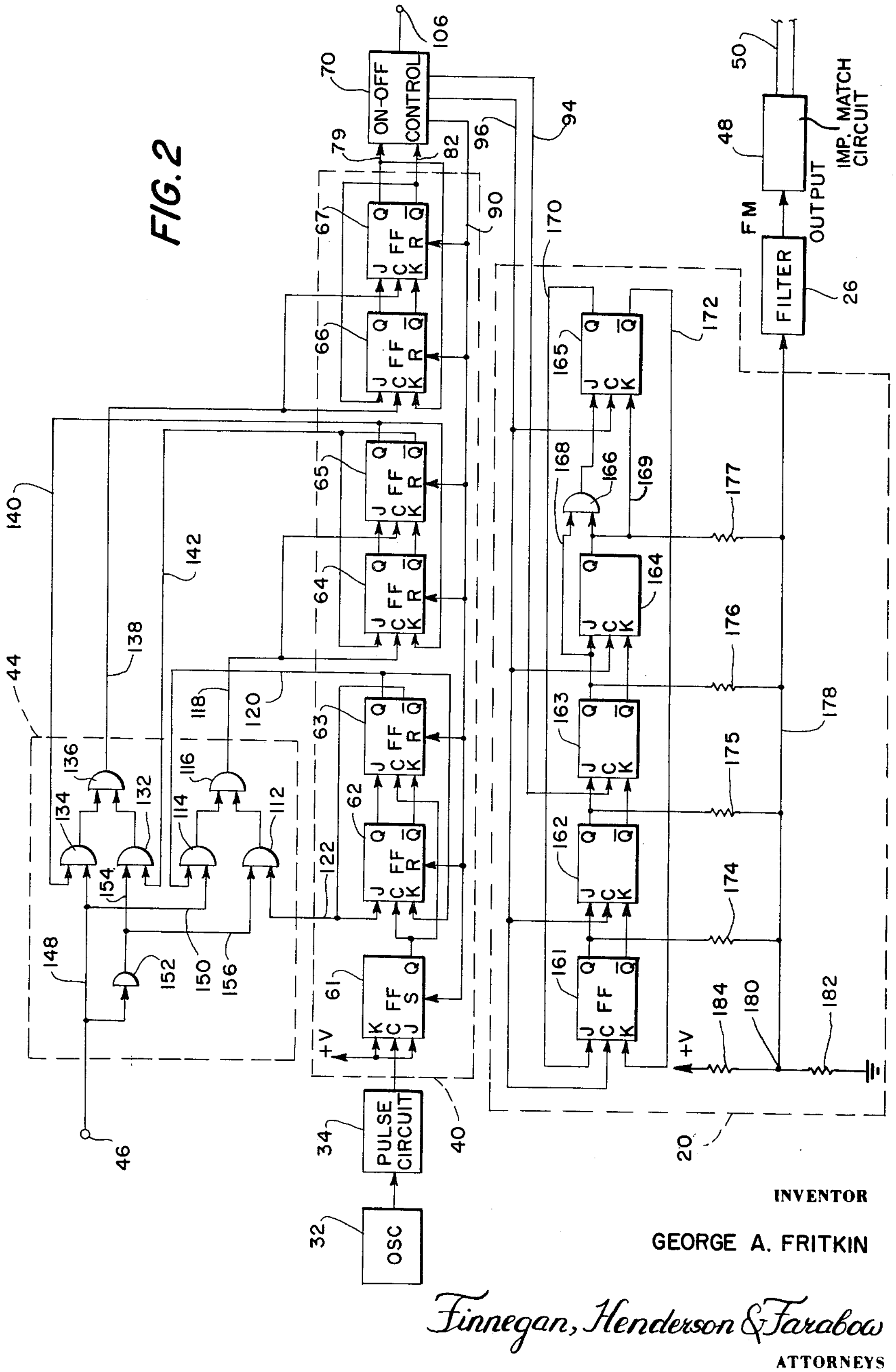
FIG. 2 is a schematic diagram illustrating the components of the frequency modulating system of FIG. 1 in more detail.

Referring to FIG. 2, the frequency modulating system of the present invention is shown in detail. The system includes a plurality of binary elements or flip-flops which are illustrated in block diagram form. Each flip-flop has a clock input terminal C, a SET terminal S, a RESET terminal R, logical input terminals J and K, and logical output terminals Q and $\overline{Q}$.

In the operation of the flip-flop, when a binary "1" is applied to input terminal J and a clock pulse is applied to input terminal C, the flip-flop is driven to its first conducting state and a binary "1" appears at output terminal Q and a binary "0" appears at terminal $\overline{Q}$. If, on the other hand, a binary "1" is applied to input terminal K and a clock pulse is applied to input terminal C, the flip-flop is driven into its second conducting state where a binary "1" appears at output terminal $\overline{Q}$ and a binary "0" appears at output terminal Q.

Further, when a binary "0" is applied to both input terminals J and K, the state of the flip-flop is not changed upon the application of a clock pulse. If a binary "1" is applied to both input terminals J and K, however, the state of the flip-flop is reversed upon the application of a clock pulse. When a pulse is applied to SET terminal S or RESET terminal R, the flip-flop is accordingly set to its first conducting state or reset to its second conducting state.

As shown in FIG. 2, frequency divider 40 includes a plurality of binary elements or flip-flops 61-67, inclusive. The output of pulse forming circuit 34 is applied to a clock input terminal C of flip-flop 61. In addition, logical inputs J and K of flip-flop 61 are connected to a common source of potential (+V).

Output terminal Q of flip-flop 61 is connected to the clock input terminals of flip-flops 62 and 63. Output terminals Q and $\overline{Q}$ of flip-flop 62 are connected to logical input terminals J and K, respectively, of flip-flop 63. In addition, the output terminal Q of flip-flop 63 is connected to logical input K of flip-flop 62, and output terminal $\overline{Q}$ of flip-flop 63 is connected to logical input J of flip-flop 62.

The output terminals Q and $\overline{Q}$ and logical input terminals J and K of flip-flops 64 and 65 are interconnected in the same manner as the corresponding terminals of flip-flops 62 and 63. In addition, the output terminals Q and $\overline{Q}$ and logical input terminals J and K of flip-flops 66 and 67 are similarly interconnected. The output terminals Q and $\overline{Q}$ of flip-flop 67 are connected to an ON-OFF control circuit 70.

Figure 3:
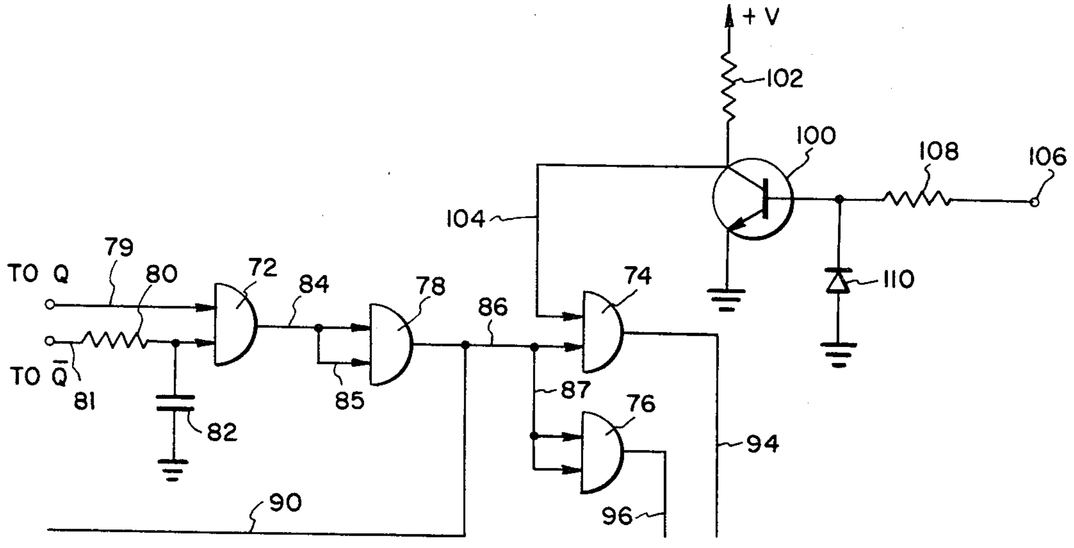
FIG. 3 is a schematic diagram of an on-off control circuit for the frequency modulating system of FIG. 1.

Referring to FIG. 3, the ON-OFF control circuit includes a plurality of NOR gates 72, 74, 76, and 78. A first input terminal of NOR gate 72 is connected directly to output terminal Q of flip-flop 67 by conductor 79. A second input terminal of NOR gate 72 is connected by a resistance 80 to a conductor 81 which is connected to output terminal $\overline{Q}$ of flip-flop 67. A capacitance 82 is connected between the second input terminal of NOR gate 72 and ground.

The output terminal of NOR gate 72 is connected by conductors 84 and 85 to the input terminals of NOR gate 78. The output terminal of NOR gate 78 is connected by a conductor 86 to a first input terminal of NOR gate 74. In addition, the output terminal of NOR gate 78 is connected to the input terminals of NOR gate 76 by a conductor 87.

A conductor 90 is also connected to the output terminal of NOR gate 78. Referring to FIG. 2, conductor 90 which extends from ON-OFF control circuit 70 is connected to SET terminal S of flip-flop 61 and to RESET terminals R of flip-flops 62–67, inclusive.

As shown in FIG. 3, the output terminals of NOR gates 74 and 76 are connected to conductors 94 and 96, respectively. Referring to FIG. 2, conductors 94 and 96 extend from ON-OFF control circuit 70 and are connected to digital to analog converter 20, as explained below.

The ON-OFF control circuit (FIG. 3) includes a transistor 100 having collector, emitter, and base electrodes. The collector electrode of transistor 100 is connected to a source of potential (+V) through a resistance 102, and the emitter electrode of transistor 100 is connected to ground. In addition, the collector electrode of the transistor is connected by a conductor 104 to a second input terminal of NOR gate 74.

The ON-OFF control circuit is provided with an input terminal 106 which is connected through a resistance 108 to the base electrode of transistor 100. In addition, a diode 110 connects the base electrode of the transistor to ground. Input signals are applied to terminal 106 to turn on and turn off the frequency modulating system.

The frequency selecting circuit of a preferred embodiment of the present invention interconnects at least two of the flip-flops of the frequency divider for selectively altering the operating sequence of the flip-flops of the frequency divider to change the frequency of the output pulses produced by the frequency divider. The frequency selecting circuit includes first and second sets of gates, each responsive to a binary input signal to the system and to one of the flip-flops of the frequency divider and having an output terminal connected to the next adjacent flip-flop of the frequency divider for altering the operating sequence of the flip-flops in response to the binary input signal.

As shown in FIG 2, the frequency selecting circuit includes a first pair of NOR gates 112 and 114 having their output terminals connected to the input terminals of an OR gate 116. The output terminal of OR gate 116 is connected by a conductor 118 to clock input terminals of flip-flops 64 and 65. The output terminal Q of flip-flop 63 is connected by a conductor 120 to a first input terminal of NOR gate 114. In addition, the output terminal $\overline{Q}$ of flip-flop 63 is connected by a conductor 122 to a first input terminal of NOR gate 112.

The frequency selecting circuit also includes a second pair of NOR gates 132 and 134 having their output terminals connected to the input terminals of an OR gate 136. The output terminal of OR gate 136 is connected by conductor 138 to the clock input terminals of flip-flops 66 and 67. The output terminal $\overline{Q}$ of flip-flop 65 is connected by a conductor 140 to a first input terminal of NOR gate 134. The output terminal Q of flip-flop 65 is connected by a conductor 142 to a first input terminal of NOR gate 132.

As explained above, input terminal 46 is provided for applying binary input signals to frequency selecting circuit 44. In FIG. 2, binary input terminal 46 is connected by a conductor 148 to a second input terminal of NOR gate 134. In addition, a conductor 150 connects a second input terminal of NOR gate 114 to conductor 148 and binary input terminal 46.

The binary input terminal 46 is also connected through an inverter 152 to a conductor 154 connected to a second input terminal of NOR gate 132. In addition, a conductor 156 connects conductor 154 and the output of inverter 152 to a second input terminal of NOR gate 112.

Thus, the binary input signal of terminal 46 is applied directly to input terminals of NOR gates 114 and 134, and an inverted binary input signal is applied through inverter 152 to input terminals of NOR gates 112 and 132.

In the preferred embodiment of the frequency modulating system of the present invention, the digital to analog converter includes a counting circuit having a plurality of binary counting stages. In response to input pulses applied to the counting circuit, the binary counting stages of the counting circuit are operated in a predetermined counting sequence in which the binary stages turned on one at a time until all of the stages are turned on, and then the binary stages are turned off one at a time until all the stages are turned off.

Referring to FIG. 2, digital to analog converter 20 includes a counting circuit comprising a plurality of binary elements or flip-flops 161–165, inclusive. Output terminals Q and $\overline{Q}$ of flip-flop 161 are connected to logical terminals J and K, respectively, of flip-flop 162. Similarly, the output terminals of flip-flop 162 are connected to the logical input terminals of flip-flop 163 and the output terminals of flip-flop 163 are connected to logical input terminals of flip-flop 164.

As shown in FIG. 2, the counting circuit of digital to analog converter 20 includes a NOR gate 166 having its output terminal connected to logical input terminal J of flip-flop 165. This NOR gate is provided to maintain the counting circuit in its predetermined counting sequence.

The output terminal Q of flip-flop 164 is connected to a first input terminal of NOR gate 166. In addition, the output terminal Q of flip-flop 164 is directly connected to logical input K of flip-flop 165 by a conductor 169. A conductor 168 connects output terminal Q of flip-flop 163 to a second input terminal of NOR gate 166.

The output terminal Q of flip-flop 165 is connected to logical input terminal J of flip-flop 161 by a conductor 170. In addition, the output terminal $\overline{Q}$ of flip-flop 165 is connected by a conductor 172 to logical input K of flip-flop 161.

The preferred embodiment of the frequency modulating system also includes means for combining the output signals produced by the binary counting stages of the counting circuit to provide a signal consisting of a series of incremental voltage changes corresponding to the changes in voltage which occur in a sinusoidal signal. In the preferred embodiment of the circuit, this means comprises a resistance summing network including a plurality of weighted resistances connected to output terminals of the counting stages and to a common output terminal. The weighted resistances as explained below are weighted so as to produce incremental voltage changes at the common output terminal corresponding to voltage changes which occur in a sinusoidal signal.

As embodied, the resistance summing network includes resistances 174–177 (FIG. 2), inclusive. Resistances 174–177 are connected to output terminals Q of flip-flops 161–164, respectively. In addition, the resistances are connected to a conductor 178 which, in turn, connects resistances 174–177 to a common output terminal 180.

The preferred embodiment includes a resistance bridge having a terminal connected to the common output terminal of the resistance summing network. As embodied, the resistance bridge comprises resistances 182 and 184 connected to common output terminal 180. Resistance 184 is also connected to a source of potential (+V) and resistance 182 is also connected to ground. Resistances 182 and 184 provide a predetermined voltage at common terminal 180. It should be noted, however, that digital to analog converter 20 can be operated without the resistance bridge to provide a signal at terminal 180 which is approximately in the form of a sinusoid.

As shown in FIG. 2, conductor 178 is also connected to filter 26 which eliminates discontinuities in the output signal of digital to analog converter 20. In the frequency modulating system of the present invention, any conventional filter, such as an R–C filter, can be used. As explained above, the output of filter 26 is applied to telephone line 50 through a conventional output amplifying and impedance matching circuit 48.

In the operation of the frequency modulating system of the preferred embodiment (FIG. 2), oscillator 32 is continuously operated to produce a sinusoidal output signal at a predetermined frequency. In the preferred embodiment, a crystal oscillator is used which produces a sinusoidal output signal at a frequency of 1.3589 MHz. The output signal of oscillator 32 is illustrated in FIG. 5A.

Pulse forming circuit 34 transforms the sinusoidal output signal of oscillator 32 into a series of pulses (FIG. 5B) which occur at the same predetermined frequency as the output signal of the oscillator. The pulses from pulse forming circuit 34 are applied to the clock input terminal of flip-flop 61 of frequency divider 40. The frequency divider produces a series of output pulses on conductor 79 occurring at a frequency which is less than the predetermined frequency of the input pulses applied to the frequency divider.

The frequency of the output pulses produced by frequency divider 40 is determined by the operating sequence of flip-flops 61–67. This operating sequence is controlled by frequency selecting circuit 44.

In the operation of the frequency modulating system, it is assumed that voltage transitions from binary "1" to binary "0" are used to operate NOR gates 112, 114, 132, and 134 and to provide clock input pulses for the flip-flops of frequency divider 40. It is further assumed that voltage transition from binary "0" to binary "1" provide clock input pulses for the flip-flops of digital to analog converter 20. It should be noted, however, that in the alternative, the opposite voltage transition can be used to operate the NOR gates and flip-flops of the system.

When a binary "1" signal is applied to input terminal 46, this signal is applied by conductor 148 to one input terminal of NOR gate 134 and by conductor 150 to one input terminal of NOR gate 114. In addition, the binary "1" signal is inverted by inverter 152, and a binary "0" signal is applied by conductor 154 to one input terminal of NOR gate 132 and by conductor 156 to one input terminal of NOR gate 112.

With a binary "0" applied to the input terminal of NOR gate 112 connected to conductor 156, NOR gate 112 produces a binary "1" output signal when the output signal of terminal $\overline{Q}$ of flip-flop 63 changes from a binary "1" to a binary "0." The voltage transition which occurs as a result of this change is applied to the other input terminal of NOR gate 112 by conductor 122. When this transition occurs, the binary "1" output signal of NOR gate 112 is applied to OR gate 116. The OR gate thus produces an output pulse which is applied by conductor 118 to the clock input terminals of flip-flops 64 and 65.

In the alternative, when a binary "0" signal is applied to input terminal 46, a binary "0" input signal is applied by conductor 148 to one input terminal of NOR gate 134, and by conductor 150 to one input terminal of NOR gate 114. At the same time, binary "1" input signal is applied from inverter 152 by conductor 154 to one input terminal of NOR gate 132 and by conductor 156 to one input terminal of NOR gate 112. Thus, with a binary "0" signal applied to input terminal 46, NOR gate 114 produces a binary "1" output signal when the output signal of terminal Q of flip-flop 63 changes from a binary "1" to a binary "0." The binary "1" to binary "0" voltage transition which occurs at output terminal Q of flip-flop 63 is applied to the other input terminal of NOR gate 114 by conductor 120, and NOR gate 114 produces a binary " 1" output signal which is applied to OR gate 116. The OR gate thus produces an output signal which is applied by conductor 118 to the clock input terminals of flip-flops 64 and 65.

The operation of NOR gates 132 and 134 and OR gate 136 is similar to the operation of NOR gates 112 and 114 and OR gate 116 described above. With a binary "1" signal applied to input terminal 46, NOR gate 132 produces a binary "1" output signal when the output signal of terminal $\overline{Q}$ of flip-flop 65 changes from a binary "1" to a binary "0." At this time, OR gate 136 produces an output pulse which is applied by conductor 138 to the clock input terminals of flip-flops 66 and 67.

With a binary "0" signal applied to input terminal 46, NOR gate 134 produces binary "1" output signal when the output signal of terminal Q of flip-flop 65 changes from a binary "1" to a binary "0." At this time, OR gate 136 produces an output pulse which is applied by conductor 138 to the clock input terminals of flip-flops 66 and 67.

...description, it can be understood that the
...depends on the binary
quency
lied to
are ar-
and 65
changes
and 67
dergoes
0 divides
circuit 34
.
al 46, the
t a clock
a binary
flip-flop
e transi-
equency
m pulse
ency of inal 46,
ansition
lses are
ary "0"
al Q of
ansition ary "1"
ts input
ary "1"
79. This
of flip-
ry "0."
flop 67
e time,
ediately
gate 72
a time delay. When the voltage transition occurs at output terminal $\overline{Q}$, capacitance 82 initially maintains the input terminal of NOR gate 72 connected to resistance 80 at a binary "0" voltage. Thus, NOR gate 72 is allowed to produce a binary " 1" output signal when a binary "1" to a binary "0" voltage transition occurs at output terminal Q of flip-flop 67.

The binary "1" output voltage of NOR gate 72 is applied to the input terminals of NOR gate 78 by conductors 84 and 85. NOR gate 78 acts as an inverter and produces a binary "1" to binary "0" voltage transition at its output terminal which is applied to conductors 86 and 90. The binary "1" to binary "0" voltage transition applied to conductor 90 sets flip-flop 61 and resets flip-flops 62–67 to their initial states. Thereafter, the operating sequence of flip-flops 61–67 of frequency divider 40 starts again and the operating sequence described above is repeated.

The binary "0" output voltage of NOR gate 78 is applied by conductor 86 to the first input terminal of NOR gate 74 and by conductor 87 to the pair of input terminals of NOR gate 76. NOR gate 76 acts as an inverter and produces a binary "1" output signal which is applied to conductor 96.

If a positive voltage is applied to input terminal 106 of the ON-OFF control circuit to drive transistor 100 into conduction, a binary "0" voltage appears at the collector electrode of the transistor and is applied to the second input terminal of NOR gate 74 by conductor 104. NOR gate 74 thus produces a binary "1" output signal which is applied to conductor 94.

The binary "1" output signal on conductor 94 is applied to the clock input terminal of flip-flop 163 and the binary "1" output signal on conductor 96 is applied to clock input terminals of flip-flops 161, 162, 164, and 166 to operate the counting circuit. Assuming that the counting circuit starts its operation with flip-flops 161–164 in their binary "0" state and flip-flop 165 in its binary "1" state, the counting circuit of digital to analog converter 20 operates according to the sequence illustrated in FIG. 4.

Figures 4, 5:
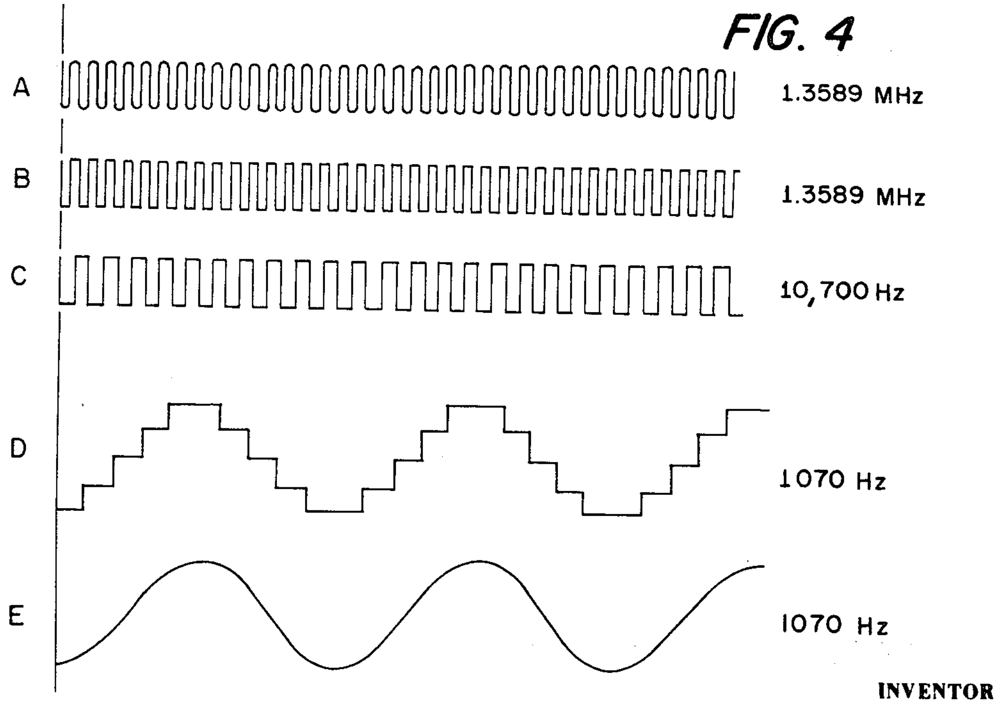
FIG. 4 is a logic table which illustrates the operation of the digital to analog converter of the frequency modulating system of the present invention.
FIG. 5 illustrates the output waveforms produced by the components of the frequency modulating system of the present invention.

From the counting sequence illustrated in FIG. 4, it can be seen that flip-flops 161–165 of the counting circuit are operated in a predetermined sequence in which the flip-flops are turned on one at a time until all the flip-flops are turned on and then are turned off one at a time until all the flip-flops are turned off in response to input pulses applied to the circuit. The counting sequence of flip-flops 161–165 consists of the following ten counting states: 00001, 10001, 11001, 11101, 11111, 11110, 01110, 00110, 00010, and 00000. After the ten counting states are completed, the counting sequence is repeated. This operation of the counting circuit continues as long as input pulses are applied to the counting circuit on conductors 94 and 96.

When the counting circuit is operated in the above counting sequence, flip-flops 161-164 which are connected to the resistance summing network produce binary "1" output voltages at their Q output terminals in the sequence illustrated in FIG. 4. With the counting circuit in its initial state, i.e. with flip-flops 161–164 in their binary "0" states and flip-flop 165 in its binary "1" state, the voltage appearing at common terminal 180 is determined solely by the resistance bridge formed by resistances 182 and 184. Thus, with the counting circuit in this state, the voltage appearing at common terminal 180 has its minimum value, as illustrated by the starting point of the waveform in FIG. 5D.

As the counting circuit is operated in sequence by input pulses applied to conductors 94 and 96, binary "1" voltages are applied to resistances 174–177 in accordance with the counting sequence of FIG. 4. For example, when the first input pulse is applied to the counting circuit, flip-flop 161 is driven into its binary "1" state and a binary "1" voltage appears at its output terminal Q and is applied to resistance 174. When this binary "1" voltage is applied to resistance 174, the voltage appearing at common terminal 180 is increased, as illustrated in FIG. 5D. The amount of the voltage increase is determined by the relative values of resistances 174, 182, and 184 and by the voltages applied to resistances 174 and 184. These values are selected so that the voltage increase which occurs corresponds to the voltage change in a sinusoidal waveform.

When the second input pulse is applied to the counting circuit, flip-flop 162 is driven into its binary "1" state and a binary "1" voltage appears at its output terminal Q and is applied to resistance 175. Since flip-flop 161 remains in its binary "1" state, the binary "1" voltage at output terminal Q of flip-flop 161 is still applied to resistance 174. Thus, the voltage appearing at common terminal 180 is again increased, as illustrated in FIG. 5D. The amount of the voltage increase is determined by the value of resistance 175 in relation to resistances 174, 182, and 184 and corresponds to the voltage change which occurs in a sinusoid.

As the remaining flip-flops 163 and 164 are driven into their binary "1" states, the voltage appearing at common terminal 180 is further increased as illustrated in FIG. 5D. Referring to FIG. 4, at the fourth input pulse to the counting circuit all the flip-flops 161–164 are turned on and the voltage appearing at common terminal 180 (FIG. 5D) is at its maximum value. At the fifth input pulse flip-flop 165 is turned off, but the remaining flip-flops 161–164 are still turned on. Thus, the voltage at common terminal 180 remains at its maximum value.

Thereafter, as the flip-flops 161–164 are turned off one at a time in response to input pulses applied to the counting circuit, the voltage appearing at common terminal 180 is decreased. When the ninth input pulse is applied to the counting circuit, all of the flip-flops of the counting circuit, including flip-flop 165 are turned off and the voltage appearing at common terminal 180 is returned to its initial minimum value. When the 10th input pulse is applied to the counting circuit, flip-flop 165 is returned to its initial binary "1" state. At the same time, flip-flops 161–164 remain in their binary "0" states and the output voltage at common terminal 180 remains at its minimum value. Then, as additional input pulses are applied to the counting circuit by conductors 94 and 96, the sequence of sinusoidal voltages appearing at common terminal 180 is repeated.

The operation of NOR gate 166 (FIG. 2) maintains the counting circuit for digital to analog converter 20 in a predetermined counting sequence. If the counting states of flip-flops 161–165 of the counting circuit deviate from the predetermined counting sequence, the counting circuit is automatically returned to its predetermined counting sequence by the operation of NOR gate 166. A deviation from the predetermined counting sequence can occur when the system is initially turned on, or as a result of a temporary loss of power to the system.

If, for example, flip-flops 161–165 of the counting circuit assume the counting state 10000 (a counting state which does not occur in the predetermined sequence), the counting circuit will automatically return to its predetermined counting sequence upon the continued application of clock input pulses to the flip-flops. The operation of the counting circuit from this counting state (10000) is illustrated in the following table.

| Pulse No. | Counting State |
|---|---|
| Start | 10000 |
| 1 | 01001 |
| 2 | 10101 |
| 3 | 11011 |
| 4 | 11100 |
| 5 | 01110 |
| 6 | 00110 |
| 7 | 00010 |
| 8 | 00000 |
| 9 | 00001 |

With the flip-flops of the counting circuit in the counting state 10000 at the start of its operation, the counting circuit arrives at the counting state 11100 after four input clock pulses are applied to the circuit. Referring to FIG. 2, with the counting circuit in the 11100 state, a binary "1" from output terminal Q of flip-flop 163 is applied to the first input terminal of NOR gate 166 by conductor 168, and a binary "0" from output terminal Q of flip-flop 164 is applied to the second input terminal of NOR gate 166. Thus, NOR gate 166 produces a binary "0" at its output terminal which is applied to logical input terminal J of flip-flop 165.

The binary "0" appearing at output terminal Q of flip-flop 164 is also applied to a logical input terminal K of flip-flop 165. Since, at this time, a binary "0" is applied to both logical input terminals J and K of flip-flop 165, the state of that flip-flop is not changed when the fifth input pulse is applied to its clock input terminal. Thus, flip-flop 165 remains in its binary "0" state, and the fifth input pulse drives the counting circuit to the counting state 01110.

Referring to FIG. 4, it can be seen that the counting state 01110 corresponds to one of the states of the predetermined counting sequence. Thereafter, the operation of the counting circuit is identical to the counting sequence illustrated in FIG. 4. The operation of NOR gate 166 similarly returns the counting circuit to its predetermined counting sequence from any other counting state which is not a state that occurs in the predetermined sequence.

As mentioned above, resistances 174–177 of the resistance summing network are weighted in value so that the incremental voltage changes produced at the common terminal correspond to changes in voltage which occur in a sinusoidal signal. In the preferred embodiment, the resistances used in the resistance summing network can be given the following values:

| | |
|---|---|
| $R_{174}$ | 13K |
| $R_{175}$ | 8.87K |
| $R_{176}$ | 8.87K |
| $R_{177}$ | 13K |

In addition, resistances 182 and 184 having values of 1.8K can be used in the resistance bridge. When the output signal appearing at common terminal 180 (FIG. 5D) is applied to filter 26, the discontinuities in the output signal are eliminated and a sinusoidal output signal (FIG. 5E) is produced, as illustrated in FIG. 5E.

From FIGS. 4 and 5D it is clear that ten input pulses from frequency divider 40 are required for digital to analog converter 20 to produce a single cycle of its output signal. Thus, the frequency of the sinusoidal signal produced by digital to analog converter 20 is one-tenth of the frequency of the input pulses applied to the counting circuit of the digital to analog converter by frequency divider 40. With a binary "1" signal applied to input terminal 46, the frequency of the pulses produced by frequence divider 40 is 12,700 Hz, and the frequency of the sinusoidal output signal produced by the frequency modulating system is 1,270 Hz. When a binary "0" signal is applied to input terminal 46, the frequency of the pulses produced by frequency divider 40 is 10,700 Hz, and the frequency of the sinusoidal output signal produced by the frequency modulating system is 1,070 Hz.

Thus, the frequency modulating system of the present invention provides a two-frequency system for transmitting binary information. A sinusoidal signal at a frequency of 1,270 Hz is transmitted to indicate a binary "1" and a sinusoidal signal at a frequency of 1,070 Hz, to indicate a binary "0."

In the above description of the operation of the frequency modulating system, it was assumed that a positive input signal was applied to terminal 106 of the ON-OFF control circuit. If it is desired to terminate the operation of the system, the positive input signal can be removed from terminal 106.

When the positive input signal is removed from terminal 106, NOR gate 74 produces a binary "0" output signal and the operation of flip-flop 163 of the counting circuit is terminated. With flip-flop 163 removed from the operation of the counting circuit, the input pulses applied to the counting circuit on conductor 96 drive the remaining flip-flops of counting circuit into one of two possible terminal states depending on the state of flip-flop 163 when its operation is terminated.

If flip-flop 163 is in its binary "1" state when the positive input signal to terminal 106 is removed, flip-flops 163 and 164 wind up in their binary "1" states and flip-flops 161, 162, and 165, in their binary "0" states. If, on the other hand, flip-flop 163 is in its binary "0" state when the positive input signal to terminal 106 is removed, flip-flops 161, 162, and 165 wind up in their binary "1" states and flip-flops 163 and 164, in their binary "0" states. When the operation of the system is terminated by removing the input signal at terminal 106, the operation of digital to analog converter 20 is terminated with either flip-flops 161 and 162 or flip-flops 163 and 164 in their binary "1" states. From FIG. 5D it can be seen that the operation of the digital to analog converter is terminated with its output signal midway between its minimum and maximum values.

The frequency modulating system of the present invention produces FM signals which can be used to transmit binary information. Since the system employs digital circuit components of the integrated circuit type, it is inexpensive to manufacture and very accurate in its operation.

The invention in its broader aspects is not limited to the specific details shown and described, and modifications may be made in the details of the frequency modulating system without departing from the principles of the present invention.

What is claimed is:

1. A system for producing a frequency modulated signal, which comprises:

a converting circuit for transforming a series of input pulses into a sinusoidal output signal having a frequency determined by the frequency of the input pulses, said converting circuit comprising 1. a digital to analog converter for converting the series of input pulses into an output signal consisting of a series of incremental voltage changes which is approximately in the form of a sine wave, and
2. a filter for eliminating the discontinuities in the output signal of the digital to analog converter to produce a sinusoidal output signal;

means for applying a series of input pulses to said converting circuit; and means for varying the frequency of the input pulses applied to said converting circuit to vary the frequency of the sinusoidal output signal and produce a frequency modulated sinusoidal signal.

2. The system of claim 1, wherein:

said means for applying a series of input pulses to said converting circuit includes a source for producing pulses at a predetermined frequency, and a frequency divider connected to said source for producing a series of pulses at a frequency which is less than the predetermined frequency; and said means for varying the frequency of the input pulses to said converting circuit comprises a frequency selecting circuit connected to said frequency divider for controlling the operation of said frequency divider to determine the frequency of the pulses produced at the output of said frequency divider.

3. The system of claim 2, wherein the digital to analog converter comprises:

a counting circuit having a plurality of binary counting stages which are turned on and then turned off in a predetermined sequence in response to input pulses applied to the counting circuit; and means for combining the output signals produced by said binary counting stages to provide a signal consisting of a series of incremental voltage changes corresponding to the changes in voltage which occur in a sinusoidal signal.

4. The system of claim 3, wherein the means for combining the output signals produced by the binary counting stages comprises:

a resistance summing network including a plurality of weighted resistances connected to output terminals of said counting stages and to a common output terminal, said resistance summing network producing an output signal at said common output terminal consisting of a series of incremental voltage changes corresponding to the changes in voltage which occur in the sinusoidal signal.

5. The system of claim 4, which includes:

a resistance bridge having a terminal connected to the common output terminal of said resistance summing network.

6. The system of claim 1, wherein the digital to analog converter includes:

a counting circuit having a plurality of binary counting stages operable in a predetermined sequence in which the binary stages are turned on one at a time until all of the stages are turned on, and then the binary stages are turned off one at a time until all the stages are turned off in response to input pulses applied to the counting circuit; and means for combining the output signals produced by the binary counting stages to provide a signal consisting of a series of incremental voltage changes corresponding to the changes in voltage which occur in a sinusoidal signal.

7. The system of claim 6, wherein the means for combining the output signals produced by the binary counting stages comprises:

a resistance summing network including a plurality of weighted resistances connected to the outputs of the binary counting stages;

said weighted resistances being weighted so as to produce incremental voltage changes at said common terminal corresponding to changes in voltage which occur in a sinusoidal signal in response to the output signals produced by the binary stages of said counting circuit.

a frequency selecting circuit for controlling the operation of said frequency divider in response to a binary input signal to vary the frequency of the output pulses produced by said frequency divider to obtain pulses which occur at a first or second frequency; and a converting circuit connected to the output of said frequency divider for transforming the series of output pulses from the frequency divider into a sinusoidal signal having a frequency corresponding to the frequency of the output pulses to transmit the binary input signal in the form of a frequency modulated sinusoidal signal, said converting circuit comprising 1. a digital to analog converter for converting the series of input pulses into an output signal consisting of a series of incremental voltage changes which is approximately in the form of a sine wave, and
2. a filter for eliminating the discontinuities in the output signal of the digital to analog converter to produce a sinusoidal output signal.

8. A system for transmitting binary information in the form of a frequency modulated signal, which comprises:

a source for producing pulses at a predetermined frequency;

a frequency divider connected to said source for producing a series of output pulses at a frequency less than the predetermined frequency;

9. The system of claim 8, wherein:

said frequency divider includes a plurality of flip-flops arranged in a series; and said frequency selecting circuit interconnects at least two of the flip-flops of said frequency divider for selectively altering the operating sequence of the flip-flops of said frequency divider to change the frequency of the output pulses produced by the frequency divider.

10. The system of claim 9, wherein the frequency selecting circuit comprises:

a set of gates responsive to a binary input signal to the system and to the output signals of one of the flip-flops of said frequency divider and having an output terminal connected to the clock input terminal of the next adjacent flip-flop of the frequency divider for altering the operating sequence of the flip-flops in response to the binary input signal.

11. The system of claim 9, wherein the frequency selecting circuit comprises:

a binary input terminal for receiving binary input signals;
an inverter having an input terminal connected to said binary input terminal and an output terminal;
an OR gate having a pair of input terminals and an output terminal;
a first NOR gate having an input terminal connected to said binary input terminal and another input terminal connected to an output terminal of one of the flip-flops of said frequency divider, said first NOR gate also having an output terminal connected to one of the input terminals of said OR gate; and
a second NOR gate having an input terminal connected to the output terminal of said inverter and another input terminal connected to the other output terminal of that flip-flop, said second NOR gate also having an output terminal connected to the other input terminal of said OR gate;
said output terminal of said OR gate being connected to the clock input terminal of the next adjacent flip-flop of said frequency divider.

12. The system of claim 9, wherein the frequency selecting circuit comprises:
a first set of gates responsive to a binary input signal to the system and to the output signals of a first one of the flip-flops of said frequency divider and having an output terminal connected to the clock input terminal of the flip-flop of the frequency divider next adjacent to that first flip-flop for altering the operating sequence of the flip-flops in response to the binary input signal; and
a second set of gates responsive to the binary input signal to the system and to the output signals of a second one of the flip-flops of said frequency divider and having an output terminal connected to the clock input terminal of the flip-flop of the frequency divider next adjacent to that second flip-flop for altering the operating sequence of the flip-flops in response to the binary input signal.

13. The system of claim 9, wherein the frequency selecting circuit comprises:
a binary input terminal for receiving binary input signals;
an inverter having an input terminal connected to said binary input terminal and an output terminal;

a first set of gates comprising:
a. a first OR gate having a pair of input terminals and an output terminal;
b. a first NOR gate having an input terminal connected to said binary input terminal and another input terminal connected to an output terminal of a first one of the flip-flops of said frequency divider, said first NOR gate also having an output terminal connected to one of the input terminals of said first OR gate; and
c. a second NOR gate having an input terminal connected to the output terminal of said inverter and another input terminal connected to the other output terminal of that first flip-flop, said second NOR gate also having an output terminal connected to the other input terminal of said first OR gate;
d. said output terminal of said first OR gate being connected to the clock input terminal of the flip-flop of said frequency divider next adjacent to that first flip-flop; and
a second set of gates comprising:
a. a second OR gate having a pair of input terminals and an output terminal;
b. a third NOR gate having an input terminal connected to said binary input terminal and another input terminal connected to an output terminal of a second one of the flip-flops of said frequency divider, said third NOR gate also having an output terminal connected to one of the input terminals of said second OR gate; and
c. a fourth NOR gate having an input terminal connected to the output terminal of said inverter and another input terminal connected to the other output terminal of that second flip-flop, said fourth NOR gate also having an output terminal connected to the other input terminal of said second OR gate;
d. said output terminal of said second OR gate being connected to the clock input terminal of the flip-flop of said frequency divider next adjacent to that second flip-flop.

* * * * *

UNITED STATES PATENT OFFICE
CERTIFICATE OF CORRECTION

Patent No. 3,668,562 Dated June 6, 1972

Inventor(s) George A. Fritkin

It is certified that error appears in the above-identified patent and that said Letters Patent are hereby corrected as shown below:

Rewrite claims 7 and 8 as follows:

7. The system of claim 6, wherein the means for combining the output signals produced by the binary counting stages comprises:

a resistance summing network including a plurality of weighted resistances connected to the outputs of the binary counting stages;

said weighted resistances being weighted so as to produce incremental voltage changes at said common terminal corresponding to changes in voltage which occur in a sinusoidal signal in response to the output signals produced by the binary stages of said counting circuit.

8. A system for transmitting binary information in the form of a frequency modulated signal, which comprises:

a source for producing pulses at a predetermined frequency;

a frequency divider connected to said source for producing a series of output pulses at a frequency less than the predetermined frequency;

a frequency selecting circuit for controlling the operation of said frequency divider in response to a binary input signal to vary the frequency of the output pulses produced by said frequency divider to obtain pulses which occur at a first or second frequency; and a converting circuit connected to the output of said frequency divider for transforming the series of output pulses from the frequency divider into a sinusoidal signal having a frequency corresponding to the frequency of the

UNITED STATES PATENT OFFICE
CERTIFICATE OF CORRECTION

Patent No. 3,668,562 Dated June 6, 1972

Inventor(s) George A. Fritkin

It is certified that error appears in the above-identified patent and that said Letters Patent are hereby corrected as shown below:

(Cont'd)

output pulses to transmit the binary input signal in the form of a frequency modulated sinusoidal signal, said converting circuit comprising 1. a digital to analog converter for converting the series of input pulses into an output signal consisting of a series of incremental voltage changes which is approximately in the form of a sine wave, and 2. a filter for eliminating the discontinuities in the output signal of the digital to analog converter to produce a sinusoidal output signal.

Signed and sealed this 5th day of September 1972.

(SEAL)
Attest:

EDWARD M.FLETCHER,JR.
Attesting Officer

ROBERT GOTTSCHALK
Commissioner of Patents